FIG. I
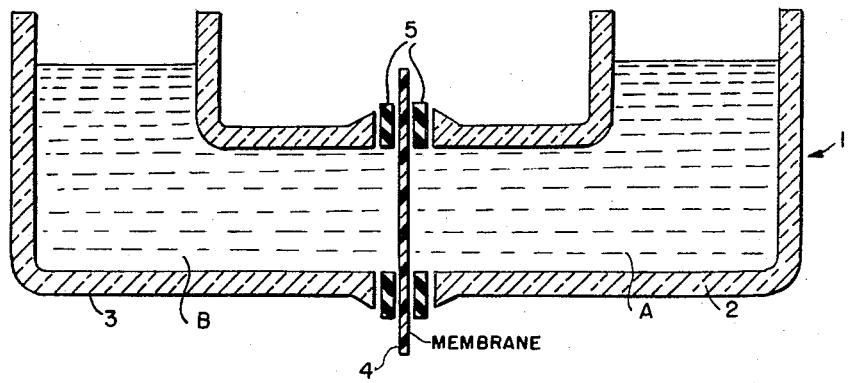
FIG. 2
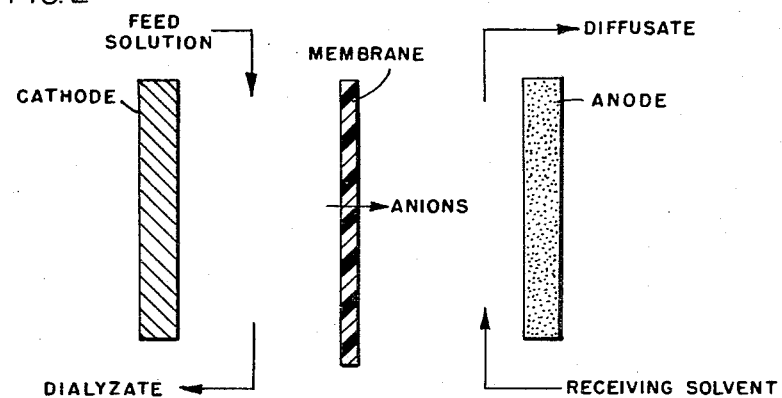
FIG. 3
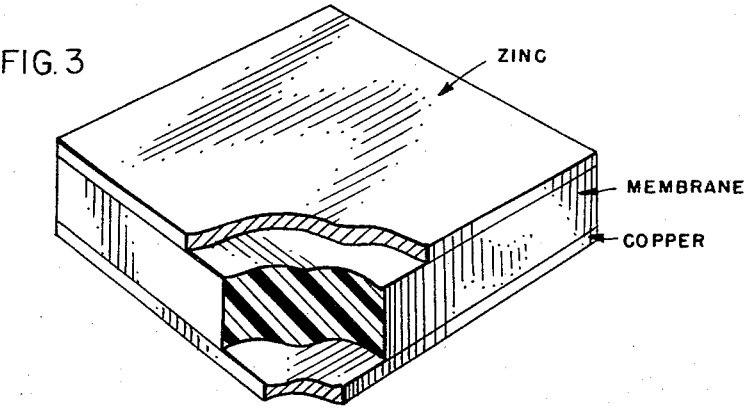
INVENTORS:
MORRIS MINDICK
HAROLD I. PATZELT
BY
ATT'YS United States Patent Office 3,297,595
Patented Jan. 10, 1967

3,297,595
SEMI-PERMEABLE MEMBRANE AND
PRODUCTION THEREOF
Morris Mindick, Chicago, and Harold I. Patzelt, Oak Lawn, Ill., assignors to Nalco Chemical Company, Chicago, Ill., a corporation of Delaware
Continuation of application Ser. No. 755,571, Aug. 18, 1958. This application June 30, 1964, Ser. No. 381,287
7 Claims. (Cl. 260—2.5)

This application is a continuation of application Serial No. 755,571, filed August 18, 1958, now abandoned.

This invention relates to new and improved semi-permeable membranes and their production, and also to novel methods and apparatus employing the new membranes. The membranes are especially useful in dialysis methods and apparatus.

Dialysis has proven to be useful in a number of applications, such as in the recovery of caustic soda, of acids and of sugars. Thus, caustic soda is recovered from industrial wastes in the viscose industry. Acids and metals are separated from electrolytic liquors. Sugars may be separated from dextrins in corn starch conversion syrup. Dialysis may also be employed in the production of dairy products, such as in separation of solutes in skim milk. In these applications, parchment and cellophane are commonly used as semi-permeable membranes or dialyzers. Semi-permeable membranes find application as battery separators. Other applications of dialysis are made, and potential applications await the development of suitable techniques and, particularly, more satisfactory commercial membranes. In present and contemplated applications, there exists a need for membranes having substantial resistance to the chemical and physical conditions encountered and yet which provide low resistance to diffusion therethrough.

Dialysis membranes are commonly prepared by blending a substantial proportion of a leachable material such as sodium chloride into a water-insoluble resinous film-forming material. The soluble material is leached from the film to produce a macroporous membrane. However, the membranes produced in this manner are relatively weak. Cellophane has molecular-size pores but low acid resistance, which limits its usefulness. Likewise, the useful life of parchment is short.

The present invention has for its object to provide new and improved semi-permeable membranes which overcome the disadvantages previously encountered and increase the number and efficiencies of dialysis operations.

A particularly object is to provide semi-permeable membranes which are characterized by improved resistance to the chemical and physical conditions encountered, and especially, have much improved resistance to acid and alkali attack.

A further object is to provide semi-permeable membranes which are characterized by low resistance to diffusion therethrough.

An additional object is to provide strong membranes which are resistant to the physical forces encountered in use and which are adaptable to use in various apparatuses such as dialyzers and electrolytic cells.

Another object is to provide a method for producing semi-permeable membranes having the described characteristics, and especially a convenient and reliable method.

A further object is to provide a method for producing the membranes which may be controlled to produce the characteristics desired in the membranes, such as the desired resistance, water-holding capacity or porosity, and dimensions.

Additional objects of the invention include the provision of new dialysis methods, including electrodialysis, and dialyzators including more specialized apparatus such as electrical cells including voltage and/or electrolytic cells. These and other objects of the invention will be apparent upon reference to the specification taken in conjunction with the attached drawings, in which like parts are identified by like reference characters in each of the views, and in which FIGURE 1 is a schematic representation of a dialysis cell employing a membrane according to the invention, the cell being a simple form adapted for test purposes;

FIGURE 2 is a schematic representation of a simple electrodialysis cell employing a membrane according to the invention, illustrating a method of electrodialyzing a feed solution; and FIGURE 3 is a schematic representation of a simple voltaic cell.

The new semi-permeable membrane of the invention comprises a solid layer of a homogeneous molecular dispersion of a water-insoluble, acid and alkali-resistant thermoplastic film-forming polymer and a linear polar polymer, the layer having high porosity relative to the porosities of layers of plastic material prepared by conventional methods. The layers providing a semi-permeable membrane preferably have a water-holding capacity of at least 45% by weight on a wet basis. In a preferred embodiment of the invention, the layer contains a substantial quantity of pores over 30 angstrom units in size, and the pore size may be limited in a further preferred embodiment to about 100 angstrom units.

It is necessary for utility as a semi-permeable membrane that the layer have a low resistance to the diffusion of materials therethrough. Thus, a maximum resistance is provided in the layer of 10 ohms per square centimeter when measured in 0.15 N KCl. Specific applications may require lower resistances. For example, it is preferred to provide a membrane having a maximum of about 6 ohms resistance for dialysis of caustic solutions.

It is further preferred in the case of battery separators that the resistance be a maximum of about 2 ohms as measured in the foregoing manner.

In the provision of such porous films of low resistance, it has been found to be essential that the layer include a polar compound. The available film-forming compositions do not provide the required porosity and do not respond to efforts to increase the porosity. For example, a film of a copolymer of vinyl chloride and acrylonitrile was lacking in sufficient porosity when cast and could not be swollen by solvent treatment to produce the necessary porosity. Incorporation of other non-polar organic materials at times enabled provision of increase porosity, but resistances were high.

It has also been found to be necessary in the invention that the polar compound included in the membrane layer be a polymer. Various compositions which include polar compounds of other types may be provided with high porosity yet have no appreciable electrolytic conduction or very high resistance. For example, films composed of a copolymer of vinyl chloride and acrylonitrile, and petroleum sulfonates as polar compounds could be swollen to provide increased porosity but gave no appreciable electrolytic conduction. Also, the incorporation of other nonpolymeric polar materials resulted not only in high resistance but unsatisfactory porosity.

The inclusion of a polar material is required in the invention for producing a membrane which both has the necessary porosity and provides low resistance. In order to achieve the low resistance, it is also necessary that a linear polymeric material be employed, which apparently acts to provide the necessary diffusion paths through the membrane. High molecular weight polymers are most desirably employed. Consequently, a minimum molecular weight of the polar polymer of about 5000 is preferred, and it is further preferred that the molecular weight be at least about 20,000.

The invention also provides a method for producing the new and improved semi-permeable membranes, which involves contacting a relatively impermeable solid layer of the type described with a mixture of a swelling solvent for the layer and water or methanol, preferably methanol. Reference to a relatively impermeable layer contemplates a layer which is unsuitable as a semi-permeable membrane in dialysis and like operations as conducted with such membranes. The method is conducted to produce a layer containing pores sufficiently large for semi-permeation of the layer. Very advantageously, the method may be carried out to provide a macroporous layer having the desired porosity and low resistance, which as previously noted is a maximum of 10 ohms.

The relatively impermeable layer treated according to the invention is preferably produced by casting a mixture of the described polymers and an organic solvent. The polymers may be dissolved in the solvent or, at times, it is advantageous to cast a relatively viscous mixture or paste in which some of the polymeric material is dispersed but incompletely dissolved. Such mixtures are known as organosols or plastisols, and it is possible to prepare a higher solids content mixture than when using solutions. Further reduction in the quantity of solvent may be made by preparing solutions hot and in some cases, melts containing little solvent may be made. Other modifications may be necessary depending upon the polymeric materials, it merely being necessary that upon the completion of the casting process including removal of sufficient solvent to provide a solid film, a homogeneous molecular dispersion of the polymers is obtained which is equivalent to the product of casting a complete solution.

In this manner, very useful uniform semi-permeable membranes are provided. The membranes are strong while having low resistance. They are produced in a range of desired thicknesses, porosities and resistances, and substantially any useful size of membrane may be produced for any of diverse applications.

The invention also provides improved dialysis methods and dialyzators employing the new semi-permeable membranes. A preferred method comprises interposing a membrane between two solutions at least one of which contains a plurality of solutes, at least one of the solutes being diffusible through the membrane. A decreasing potential, with respect to the diffusible solute, is maintained from the solution containing a plurality of solutes to the second solution, thereby causing the diffusible solute to diffuse through the membrane from the solution of higher potential to the solution of lower potential. The potential differential or gradient may be provided for example by an applied voltage as in electrodialysis. Also, a concentration differential between the solutions may be provided, causing the solute to diffuse through the membrane from the solution of higher concentration to the solution of lower concentration. The differential may be maintained by supplying fresh solute solution to the zone of higher concentration contacting one side of the membrane and/or removing the diffusate from contact with the opposite side of the membrane.

Specific examples of dialyzators are illustrated in the attached drawings, which include apparatus for conducting simple dialysis operations and a voltaic cell in which dialysis is accompanied by the production of electrical energy.

FIGURE 1 illustrates a dialysis cell 1 composed of two half cells 2 and 3 which define compartments A and B. The compartments are separated by a membrane 4 prepared according to the invention. The half cells 2 and 3 are in the form of glass elbows, and their juncture with the membrane is sealed by rubber or Teflon gaskets 5. A solution concentrated with respect to the solutes to be dialyzed is placed in one compartment A, and a less concentrated receiving solvent is placed in the other compartment B. Due to the concentration differential, diffusible solutes diffuse from compartment A through the membrane 4 into compartment B.

In a unit of the type illustrated in FIGURE 1, diffusion is by concentration differential of the solutes, on opposite sides of the membrane. FIGURE 2 illustrates electrodialysis, wherein a decreasing potential from the cathode compartment to the anode compartment is maintained by an applied voltage. Also, there may be a concentration differential from the feed solution containing the solutes to be diffused, to the receiving solvent. The embodiment illustrated is adapted for the separation of anions. The diffusate becomes enriched in the solutes having a higher rate of diffusion, and the dialysate is enriched in those having lower diffusion rates, according to known principles.

FIGURE 3 schematically illustrates a simple essentially dry voltaic cell composed of zinc and copper electrodes separated by a membrane prepared according to the invention. In this embodiment, the electrolyte is contained in the membrane, and the membrane maintains differences in the concentration and/or the composition of the electrolyte in the immediate vicinity of each electrode. The cell is adapted for use in the manner described in U.S. Patent 2,747,009.

In similar fashion, the membranes are employed in cells such as described in U.S. Patent 2,422,045, where the membranes may serve as the barrier disc 32, for example. The membranes provide mechanical spacing means between the cathode and the anode and also prevent or limit migration of compounds and solids between the electrodes. The membrane pores permit the electrolyte to permeate therethrough for electrical contact with the electrodes, but owing to the semi-permeable nature thereof, reduce or prevent the free circulation of electrolyte. Use of the membranes of the invention provides a desirably low internal resistance in the cell. The new membranes are especially advantageous for use in portable hearing aids and the like, as illustrated in U.S. Patent 2,768,229. In such a cell, the membrane serves as the electrolyte carrier 9.

It has been found that a very advantageous type of linear polar polymer for use in the invention is a linear polyelectrolyte, in combination with a thermoplastic film-forming polymer, each as described in copending patent application Serial No. 511,062 filed May 25, 1955, now matured into U.S. Patent 3,004,904, and in patent application Serial No. 513,944 filed June 8, 1955, now matured into U.S. Patent 3,004,909, both by Gregor and Patzelt. The polyelectrolytes are preferably water-soluble, such polymers constituting a preferred class although water-solubility is not a necessary property in the invention.

The class of polar polymers which comprises the polyelectrolytes has been discovered to provide very useful semi-permeable membranes having low resistance to diffusion; however, it is not essential that the polar polymer be a polyelectrolyte. While the presence of ionic groups contributes somewhat to a lowered resistance, the effect thereof is secondary to the effect of the porosity in providing the desired diffusion and the very low resistance. The more important function of the polyelectrolyte is that it evidently assists in providing the requisite physical structure for a semi-permeable membrane.

At the same time, the aforementioned advantage is achieved with the polyelectrolytes, that the resistance is lowered further. Also, the presence of numerous ionic functional groups permits of treatment of the membranes to exchange the exchangeable ions thereon for other ions.

According to the aforementioned patent applications, ion selective permeable membranes are produced which are characterized by high permselectivities and ohmic resistances which are relatively low for permselective membranes. Such membranes have, however, insufficient porosity and generally higher ohmic resistances than are acceptable for the desired dialysis operations.

It has been discovered in the invention that the membranes prepared as described in the aforementioned applications, and as further preferably prepared according to application Serial No. 673,105, filed July 22, 1957, now matured into U.S. Patent 2,957,206, by the present inventors, constitute very desirable starting materials for the manufacture of semi-permeable membranes by the method of the present invention. Thus, an overall preferred method for producing the new semi-permeable membranes comprises casting a mixture of a film-forming polymer and a linear polyelectrolyte to produce a relatively impermeable solid layer, which constitutes a product as produced according to the identified applications, followed by contacting the layer with a mixture of a swelling solvent and methanol or water, to swell the layer and produce pores sufficiently large for semi-permeation and a layer having the described maximum resistance of ten ohms.

The permselective membranes prepared according to the above-identified applications have a maximum water-holding capacity of about 30% by weight on a wet basis and preferably substantially lower. In comparison, the semi-permeable membranes of the present invention require a minimum water-holding capacity of about 45% by weight on a wet basis in their final form, and it is preferable when employing a polyelectrolyte that the capacity be in excess of about 50%. Very useful membranes have a capacity on the order of 65%. The upper limit may be selected as preferred for the type of dialysis contemplated, having regard to the decrease in structural strength which accompanies increased porosity.

The new semi-permeable membranes prepared from polyelectrolytes are characterized by having a substantial quantity of pores over 30 angstrom units in size, while the pore size in the aforementioned permselective membranes is considerably lower. Preferred semi-permeable membranes have pore sizes ranging from 30 to 100 angstrom units.

In a preferred practice of the invention, a membrane is prepared according to the above-identified applications by casting an intimate mixture of the film-forming polymer and the polyelectrolyte, preferably from a solution thereof, thus producing a homogeneous molecular dispersion of the materials, which is distinct from the type of mixture obtained when a solid substance is dispersed in another material and remains in such dispersed form. The membrane is preferably a mixture of a water-insoluble substantially linear polyvinyl-type thermoplastic film-forming resin and a linear polar polymer, which may be a water-soluble polyvinyl-type polyelectrolyte as in the applications mentioned, in the form of a finely porous film. The polymers are at most insubstantially and preferably not cross-linked, containing not exceeding 2% cross-linking agent, by weight of the polymer. The amount of permissible cross-linking varies with the polymer. The ability to form a film, in particular, from an organic solvent solution of the polymers, is a necessary characteristic in the invention. The infusible, insoluble substances which are for the most part brittle and tend to crack upon drying are not suitable for use in the invention.

The polyvinyl-type polymers are those derived by the additional polymerization of at least one monoolefinic compound through the unsaturated aliphatic group. They are preferably addition polymers of the unsymmetrically substituted ethylene class, comprising polymers obtained by polymerization or copolymerization of monomers containing a

group, such as vinyl halides, vinylidene halides, vinyl esters, styrenes and acrylics.

The plastic film-forming materials used in the present invention may be of several types both as regards their chemical structure and their physical properties. The plastic film-forming material should be capable of being cast into a thin homogeneous film from an organic solvent casting solution. This film should be chemically stable, resistant to acids and alkalies, and water-insoluble, in order to provide ultimately a satisfactory composite membrane film. The film-forming material must also be compatible when dissolved or dispersed in a casting solution with the polar polymer, e.g., the polyelectrolyte which is incorporated therewith at the time the membrane is cast.

A useful type of film-forming plastic material is that derived from the copolymerization of vinyl chloride and acrylonitrile. These polymers may range from between 45% and 80% by weight of vinyl chloride, preferably, between 60% and 80% vinyl chloride, the balance being acrylonitrile. Their specific viscosities at 20° C. are preferably from 0.2 to 0.6 (0.1 gram in 50 cc. acetonyl acetone). Such polymers are described in U.S. Patent No. 2,420,565. A typical polymer of this type is a commercial material sold under the trade name Dynel. This material contains a major portion, about 60%, of vinyl chloride and a minor portion, about 40%, of acrylonitrile and varies somewhat in its constituents from batch to batch as manufactured. The material as supplied in its filament or fiber form has a specific gravity of 1.31 at 81° F., a tenacity wet or dry of 2.5–3.5 grams per denier and a 42% to 40% elongation wet or dry. The material is soluble in acetone, cyclohexanone and dimethylformamide. It has a strain release beginning at 240° F. and a softening range between 300° to 325° F.

Polymers containing vinylidene chloride and vinyl chloride in a percent by weight of about 90% to 10% and copolymers of vinylidene chloride and acrylonitrile are also useful. Another type of useful polymer is the copolymers produced by the copolymerization of polyvinyl alcohol and butyraldehyde. This latter copolymerization produces polyacetals whose film-forming properties, when reacted under the proper conditions, are similar to those indicated for the vinyl chloride-acrylonitrile polymers. An additional polymer is a copolymer of vinyl chloride and vinyl acetate. The above polymers are all copolymers but homopolymers produced by the polymerization of acrylonitrile, vinyl chloride and vinylidene chloride are also contemplated.

The above listed polymers are only indicative of the general class of polymers that may be employed. The type of polymer that is useful is necessarily limited to its water-insolubility, chemical stability, and acid and alkali resistance. It is also limited by its solubility characteristics in organic solvents and its compatibility with the polar polymer or polyelectrolyte with which it is incorporated.

The preferred plastic film materials have a high degree of plastic flow and are generally clear to opaque in physical appearance. While they are water-insoluble, they have the ability to take up a quantity of water or polar organic solvent. This characteristic is important in the production and use of the membranes.

A preferred feature is the provision in the membrane of the same type of basic polymer structure in both the film-forming material and the polar polymer, that resulting from the polymerization of vinyl-type monomers. The respective polymers are thus characterized by a high degree of compatibility.

The polyelectrolyte may be electronegative or electropositive, and each may be of several types. The functional or side chain groups of the electronegative polyelectrolytes may be carboxylic, phosphonous, phosphonic or sulfonic. The preferred type of polymer is that derived by the sulfonation of linear polystyrene, preferably with about one monosulfonic group per aromatic nucleus. Likewise, polyacrylic acid may be employed. Homopolymers derived from the polymerization of one olefinic compound are preferred. Other anionic polymers are described in U.S. Patent 2,625,529.

The preferred electropositive polyelectrolytes have a quatenary ammonium nitrogen atom as their functional group. This nitrogen atom is preferably attached to the polymer by being associated or linked with an aromatic nucleus which is a side group in the linear chain. By the expression "associated with the aromatic nucleus" is meant to include nitrogen atoms which (a) are a part of the aromatic nucleus, e.g., poly N-methyl, 2-vinyl-pyridinium iodide and poly N - vinylimidazole methyl iodide; (b) are directly attached to the aromatic nucleus, e.g., polystyrene o- and p-trimethyl ammonium iodide; and (c) are attached to the aromatic nucleus by a divalent hydrocarbon radical, e.g., poly (vinyl benzyl trimethyl or triethyl ammonium iodide).

In addition to polymers containing a nitrogen atom associated with an aromatic nucleus, quaternized poly-N-vinyl amines and the poly-N-allyl amines may also be used. In the case of these latter compounds, care must be used in preparing the quaternary derivatives so that little, if any, cross-linking occurs.

Other polyamines of the type described above may be used, wherein the functional nitrogen atoms are in the form of primary, secondary, or tertiary amino groups converted to the salt form. Additional useful polyamines are those described in the above referred to U.S. Patent No. 2,625,529, particularly columns 5 and 7.

The polyelectrolytes that give most satisfactory results are primarily homopolymers derived from the polymerization of one olefinic compound. For example, a poly (vinyl benzyl trialkyl ammonium salt) and a poly(N-vinyl imidazole alkyl salt) give superior results.

In a preferred embodiment of the invention, poly (vinyl benzyl trimethyl ammonium halide) is used, prepared for example by the chloromethylation of polystyrene and subsequent amination with trimethylamine in known manner.

The initial relatively impermeable membranes from which the semi-permeable membranes are prepared, may be produced by dissolving the plastic film-forming polymer and the linear polar polymer in a suitable solvent composed of one or more organic liquids. The solution is deposited in a layer of suitable thickness, and the solvent is evaporated until a rigid film structure is obtained. Suitable solvents include such materials as butyrolactone, dimethylformamide, cyclopentanone, cyclohexanone, N,N-dimethylacetamide, and others. At times it may be advantageous to employ a solvent composed of a plurality of organic liquids, for example, cyclohexanone and isopropanol or methanol. Preferably, the solvent is gamma-butyrolactone, as described and claimed in the aforementioned application Serial No. 673,105.

Employing a butyrolactone solution, the polymer content may be up to about 30% by weight of the solution, preferably 10–30% by weight.

In the preferred polymer mixture, the proportion of polar polymer is at least 10%, preferably up to 30% and at times as high as 60% by weight of the polymer mixture. The proportion of film-forming polymer is thus about 40–90%, preferably 70–90% by weight. The casting solution contains about 9–15% of the film-forming polymer and about 1–15% of the polar polymer, by weight of the solution.

In the formation of a casting solution, it may be advantageous to form individual solutions of the polymers and filter them to remove small gel particles, followed by combining into the casting solution.

In casting the initial film, the solvent may be removed under drying conditions at a temperature up to about 400° F., the time varying with the temperature and with the thickness of the layer, e.g., from several minutes to a number of hours at about 200° F.–350° F. Drying is sufficient to reduce the solvent content of the film to 30% or less by weight of the film or layer, on a dry basis.

In the production of permselective membranes according to the aforementioned applications, it is next preferred to contact the layers with a polar liquid, preferably methanol or ethanol, followed by contacting with water. The contact times may vary widely, depending upon the composition of the membrane, the drying conditions, and its thickness, e.g., from 10–30 minutes to a number of hours.

The membranes thus produced are at least .0001″ in thickness preferably from 0.001 to 0.006″ thick, measured in the water-hydrated form. Thicker films may be produced, e.g., up to about 25 mils. The thicker films may be formed by building up several films with intermediate drying, or a single thick film may be cast and dried for an extended period of time, at e.g., 200° F.

The membranes may be cast on a number of different supports such as glass or metal plates, and they may be cast or sprayed upon porous surfaces which act as bases, supports or frameworks.

It is preferred in the present invention to further contact the membranes as thus prepared with a mixture of a swelling solvent and methanol or water, for the production of semi-permeable membranes suitable for dialysis. However, it is not essential that the preparation of the initial membrane be completed as was done previously, but the contact with polar solvents following drying may be dispensed with. Operating in this manner, and depending upon the residual solvent content of the layer, a lesser amount of swelling solvent may be employed, and while not preferred, it is possible merely to swell the layer (containing residual solvent) by the addition of methanol or water, accompanied by the application of temperatures above atmospheric. The preferred method is to immerse the initial membrane layer however prepared in a miscible mixture of a swelling solvent for the layer and methanol or water.

The preferred swelling solvent is butyrolactone, and other solvents like those employed to dissolve the polymers may be used provided that they act to swell the layer. For example, dimethylformamide, tetrahydrofuran, cyclohexanone, and cyclopentanone may be employed satisfactorily.

When membrane layers containing residual solvent are contacted or swollen only with methanol or water, it may be necessary or advantageous to heat the water to a temperature of about 150° F.–190° F. Expansion of the layer is a function of both temperature and concentration of swelling solvent in the layer.

It is preferred to immerse the layer in a mixture of the swelling solvent and methanol or water having a sufficient concentration of solvent that the necessary swelling will take place in a relatively short period of time under atmospheric conditions. For example, a preferred solution contains 20–50% of gamma-butyrolactone and the balance methanol, preferably 30% of the lactone. Employing water instead of methanol, the solvent concentration is preferably greater, e.g., about 50% of gamma-butyrolactone as compared to 30% in methanol. The proportions may vary with the solvent employed. Thus, the proportion of dimethylformamide in methanol may be about the same, but should be substantially greater in water.

The initial layer or film is immersed in the swelling solvent mixture until swelling is substantially complete, which is ordinarily a short period of time on the order of several minutes to one-half hour, employing the preferred conditions. The time will depend upon the temperature and upon the concentration of swelling solvent.

After draining the solvent mixture, the expanded or swollen layer is washed with either methanol or water. It is ordinarily preferred to wash with water, which produces less shrinking in the washing process. In the case of a methanol wash, the membrane is subsequently treated with water for use in the hydrated form. The swollen film may be somewhat soft and weak. After washing, the resulting semi-permeable membrane is hard and possesses good strength. The membrane is normally stored moist, although it may be dried with care being taken not to cause excessive shrinkage.

The swelling solvents employed with methanol or water for producing the porous membranes are generally also solvents for the components of the membranes and for the membranes themselves. It is, however, only necessary that the solvent swell the initial layer and no substantial dissolution of the layer takes place in the new method.

The following examples are illustrative of the methods, compositions and articles of the invention, but it will be understood that the invention is not limited to the particular components, proportions, conditions and procedures described therein.

*Example 1*

Dynel is dissolved in gamma-butyrolactone, in the proportion of 1 part by weight of Dynel to 4 parts of the lactone, at 200° F. with vigorous agitation. The solution is filtered to remove any polymer gel particles.

Polystyrene sulfonic acid (M.W. approximately 140,000), 1 part is dissolved in 4 parts of gamma-butyrolactone at 100° F., with agitation.

In manufacturing the membrane, 23 parts of the polystyrene sulfonic acid solution are mixed with 77 parts of the Dynel solution, heated to 160° F., filtered, and vacuum deaerated.

The resulting casting solution contains 4.6% of polystyrene sulfonic acid, 15.4% of Dynel, and 80% of gamma-butyrolactone. The resulting membrane contains 23% of the polyelectrolyte and the balance Dynel, on a completely dry basis. Electronegative membranes having other compositions are prepared in like manner.

The solution is then ready for casting. It may be cast on a glass or metal plate. For producing large quantities of the membranes, it is preferably deposited in a layer, by passing through an elongated slot onto a rotating drum or revolving belt. The layer is then dried and removed by soaking with a polar solvent or peeling the film from the casting surface.

The membranes after casting may be dried, for example, for thirty minutes at 260° F. The thickness of the film thus dried to 10.5% solvent may be 3 mils. After contacting with methanol for 18 hours followed by contacting with deionized water for 24 hours, an exemplary membrane exhibits a resistance of 12 ohms per square centimeter.

*Example 2*

Electropositive membranes are prepared in like manner to Example 1, which contain, for example, 27.5% of poly (vinyl benzyl trimethyl ammonium iodide) (M.W. approx. 60,000) and the balance Dynel, on a dry basis. The same Dynel solution as in Example 1 may be employed. The polyelectrolyte solution is produced by dissolving 1 part of the electrolyte in 4 parts of gamma-butyrolactone, and heating to 120° F. with agitation.

In production of the membranes, 27.5 parts of the polyelectrolyte solution are mixed with 72.5 parts of the Dynel solution, heated, filtered, and vacuum deaerated as in Example 1. The casting solution contains 5.5% of the polyelectrolyte, 14.5% of Dynel, and 80% of gamma-butyrolactone.

The membranes are then produced in the same manner, pouring a layer of sufficient thickness to produce the membrane thickness desired, or employing a doctor blade suitably adjusted for the desired thickness.

An exemplary membrane dried to 15% residual solvent has a thickness of 3 mils. After immersion in methanol for about 1–17 hours followed by immersion in deionized water for about 1–24 hours, the membrane has a resistance of 25 ohms per square centimeter, for example.

*Example 3*

Initial films as exemplified by Example 1 were contacted with a mixture of swelling solvent and methanol or water as summarized in the following Table I. Swelling was usually complete in 10–15 minutes. After contacting for 20–30 minutes with the solvent mixture, the layer was washed with either methanol or water, as employed in the solvent mixture.

TABLE I

| Swelling Mixture | | Percent A by Volume | Resistance, ohm/cm.² 0.15 N KCl |
|---|---|---|---|
| A | B | | |
| GBL [1] | Water | 10 | 3.2 |
| | | 30 | 2.0 |
| | | 50 | 1.4 |
| GBL [1] | Methanol | 10 | 2.8 |
| | | 20 | 2.4 |
| | | 30 | 0.8 |
| | | 50 | 0.2 |
| DMF [2] | Water | 10 | 8.8 |
| | | 50 | 2.0 |
| DMF [2] | Methanol | 10 | 3.6 |
| | | 50 | 0.4 |

[1] Gamma-butyrolactone.  [2] Dimethylformamide.

*Example 4*

Initial membranes prepared as illustrated by Example 2 were swollen and washed in like manner to Example 3, with the results summarized in Table II.

TABLE II

| Swelling Mixture | | Percent A by Volume | Resistance, ohm/cm.² 0.15 N KCl |
|---|---|---|---|
| A | B | | |
| GBL [1] | Water | 50 | 6 |
| GBL [1] | Methanol | 20 | 6.5 |
| | | 30 | 2.6 |
| | | 50 | 0.3 |
| DMF [2] | Methanol | 30 | 2.0 |
| | | 50 | 0.4 |

[1] Gamma-butyrolactone.  [2] Dimethylformamide.

*Example 5*

Initial membranes prepared according to Examples 1 and 2, respectively, were contacted with 30% gamma-butyrolactone-70% methanol, followed by washing. The initial thicknesses of the membranes according to Examples 1 and 2 were 3.2 and 2.9 mils, respectively. Table III summarizes the results obtained.

TABLE III

| Film | Wash | Final Linear Expansion, Percent | Thickness, mils | Resistance ohm/cm.² | Water-holding Capacity, Percent |
|---|---|---|---|---|---|
| Example 1 | MeOH | 39 | 4.6 | 0.9 | 67 |
| | H₂O | 42 | 5.5 | 1.0 | 71 |
| Example 2 | H₂O | 33 | 3.8 | 1.6 | 65 |

The pore sizes of these membranes were estimated by diffusion methods. The diffusion coefficients of sucrose in the film were approximately 6.5% of that in pure water. Vitamin B₁₂ diffused at 1 to 2% of the rate in water, and diffusion of hemoglobin was nil. From these results, it was estimated that a substantial proportion of the pores ranged from 30 to 100 angstrom units.

*Example 6*

An initial film is prepared by casting a mixture of 3 parts by weight of a copolymer of 90% polyvinyl chloride and 10% polyvinyl acetate, and 1 part of polyvinylimidazole methyl iodide (M.W. 20,000–50,000), dissolved in gamma-butyrolactone in a concentration of 20% of the solids. The cast film may be dried at 260° F. for one-half hour. After contacting with methanol for 2 hours followed by immersion in deionized water for 2 hours, an initial film having 44 ohms resistance is obtained.

The initial film is contacted with 30% gamma-butyrolactone-70% methanol for 20 minutes, followed by washing with water. A semi-permeable membrane having a resistance of 5 ohms is obtained, and it is characterized by exceptional resistance to caustic solution.

*Example 7*

Initial membranes are prepared according to Examples 1 and 2 except that contacting with alcohol and water after drying are omitted, i.e., the membranes contain the residual solvent. The membranes may be immersed in deionized water at 190° F. for ten minutes, after which they are immersed in cold water. Membranes of the composition of Example 1 are obtained which have a resistance of 2 ohms per square centimeter, and those having the composition of Example 2 have a resistance of 7.5 ohms per square centimeter.

The solvent-containing material according to Example 1 may be contacted with methanol at 150° F. followed by washing with water to produce a semi-permeable membrane having a resistance of 5 ohms per square centimeter.

The swelling may take place at a lower temperature by the inclusion of additional swelling solvent with the water or methanol in which the film is initially immersed. Thus, 10% of gamma-butyrolactone may be added to water, and the films immersed at 150° F. In similar fashion, it may at times be advantageous, in employing the preferred method illustrated in the preceding examples, to heat the swelling mixture, e.g., to 120° F.

*Example 8*

A portion from each of the final swollen membranes prepared as in Example 5 from membranes produced as in Examples 1 and 2, was placed between the two half cells of the dialysis test unit shown in FIGURE 1 of the drawing. The water-holding capacities of the respective membranes were 59.5 and 53.2%. A 1.0 N solution of NaCl was placed in one cell A and deionized water in the other cell B. The deionized water was stirred and its specific conductance measured periodically. The rates of increase in conductance were 1.8 and 5.0 micromhos per minute for the respective membranes. Similarly, the rates of increase in conductance with 1 N naphthalene sulfonic acid were 0.8 and 5.0 micromhos per minute, respectively. When the experiment was repeated with a 1 N solution of a high molecular weight fraction of lignin sulfonic acid in place of NaCl, no significant increase in conductance was found in the other cell.

The membranes may therefore be employed in simple dialysis, or in electrodialysis as illustrated in FIGURE 2, to separate chloride or naphthalene sulfonic acid anions from lignin sulfonic acid anions in the feed solution, the former anions being enriched in the diffusate.

In the foregoing manner, semi-permeable membranes are produced and employed which provide substantial advantages of importance in commercial applications. The membranes are characterized by very good resistance to chemical and physical attack. At the same time, they have the low resistance required for use in various applications. The membranes may be tailored to a particular use. The porosity and resistance may be adjusted, and the membranes can be made in suitable sizes and thicknesses. The new method is reliable and reproducible, and it is very well adapted for commercial production.

The invention is hereby claimed as follows:

1. In a method for producing a semi-permeable membrane of enhanced porosity wherein a homogeneous molecular dispersion of a water insoluble acid and alkali resistant thermoplastic film-forming polymer and a water soluble linear organic polar polymer having a minimum average molecular weight of about 5000 are dissolved in a solvent, the resultant solution is formed in a thin layer and solvent is removed from the layer by evaporation to produce a membrane in the form of a film having a water holding capacity of less than 45% on a wet basis, the improvement which comprises treating said membrane which may contain up to 30% of said solvent with additional solvent for said water insoluble acid and alkali resistant thermoplastic film forming polymer and said water soluble linear organic polar polymer mixed with a member from the group consisting of methanol and water until a swollen layer having a water holding capacity of at least 45% on a wet basis and having a maximum resistance of 10 ohms per square centimeter measured in 0.15 N KCl is obtained.

2. The method defined in claim 1 wherein said linear organic polar polymer is a linear organic polyelectrolyte having a minimum average molecular weight of about 5000.

3. The method defined in claim 1 wherein said solvent is butyrolactone.

4. The method defined in claim 1 wherein said polymers are vinyl polymers.

5. The method defined in claim 1 in which said additional solvent is mixed with methanol.

6. A method as claimed in claim 1 in which said semi-permeable membrane is a solid layer of a homogeneous molecular dispersion of a water insoluble, acid and alkali-resistant thermoplastic film-forming polymer and a water soluble linear organic polar polymer having a minimum average molecular weight of about 5000, said dispersion containing 40% to 90% by weight of said water insoluble acid and alkali-resistant thermoplastic film-forming polymer and 60% to 10% by weight of said water soluble linear organic polar polymer, said layer having a water holding capacity of at least 45% by weight on a wet basis, containing pores from 30 to 100 angstrom units in size, and having a maximum resistance of 10 ohms per square centimeter measured in 0.15 N KCl.

7. A product obtained by the process of claim 1.

References Cited by the Examiner

UNITED STATES PATENTS 2,957,206  10/1960  Mindick et al. _____ 260—2.1
3,004,909  10/1961  Gregor et al. _____ 260—2.1

OTHER REFERENCES

Gregor, H.P. et al.: Journal of Physical Chemistry, vol. 61, 1957, pages 141–147, QD1J9.

Wetsone, D. M. et al.: Journal of Physical Chemistry, vol. 61, 1957, pages 151–154, QD1J9.

WILLIAM H. SHORT, *Primary Examiner.*

LOUISE P. QUAST, *Examiner.*

C. A. WENDEL, *Assistant Examiner.*